United States Patent [19]

Humphrey, Jr.

[11] 4,218,508
[45] Aug. 19, 1980

[54] POLYCARBONATE ARTICLES COATED WITH AN ADHERENT, DURABLE SILICA FILLED ORGANOPOLYSILOXANE COATING AND PROCESS FOR PRODUCING SAME

[75] Inventor: James S. Humphrey, Jr., Clemmons, N.C.

[73] Assignee: General Electric Company, Pittsfield, Mass.

[21] Appl. No.: 34,434

[22] Filed: Apr. 30, 1979

Related U.S. Application Data

[63] Continuation-in-part of Ser. No. 895,943, Apr. 12, 1978, abandoned.

[51] Int. Cl.² .................. B32B 31/28; B32B 27/08; B29D 11/00; G02B 1/04
[52] U.S. Cl. .................. 428/331; 427/160; 427/163; 427/164; 427/387; 428/412; 428/447; 428/451; 428/520; 428/522; 428/913
[58] Field of Search .......... 428/331, 412, 446–448, 428/913, 451, 520, 522, 911; 427/160, 163, 164, 387

[56] References Cited

U.S. PATENT DOCUMENTS

| | | | |
|---|---|---|---|
| 3,379,607 | 4/1968 | Foster et al. | 428/447 |
| 3,396,046 | 8/1968 | Landau | 428/412 X |
| 3,451,838 | 6/1969 | Burzynski et al. | 428/412 |
| 3,582,398 | 6/1971 | Ringler | 428/412 |
| 3,650,808 | 3/1972 | Gagnon | 428/412 |
| 3,652,379 | 3/1972 | White et al. | 428/412 |
| 3,661,685 | 5/1972 | Osteen | 428/412 X |
| 3,681,167 | 8/1972 | Moore | 428/412 X |
| 3,707,397 | 12/1972 | Gagnon | 428/412 |
| 3,968,305 | 7/1976 | Oshima et al. | 428/334 |
| 3,968,309 | 7/1976 | Matsuo et al. | 428/409 |
| 3,978,178 | 8/1976 | Oshima et al. | 264/25 |
| 3,986,997 | 10/1976 | Clark | 428/412 |
| 4,026,826 | 5/1977 | Yoshida et al. | 260/2 S |
| 4,027,072 | 5/1977 | Molari | 428/412 |
| 4,027,073 | 5/1977 | Clark | 428/447 |
| 4,041,120 | 8/1977 | Oshima et al. | 264/171 |
| 4,045,602 | 8/1977 | Sommer et al. | 427/386 |
| 4,064,286 | 12/1977 | Hahn | 427/44 |
| 4,103,065 | 7/1978 | Gagnon | 428/412 |
| 4,123,588 | 10/1978 | Molari | 428/447 X |

*Primary Examiner*—Harold Ansher
*Attorney, Agent, or Firm*—William F. Mufatti; Myron B. Kapustij

[57] ABSTRACT

A coated polycarbonate article comprising a polycarbonate substrate having (i) a primer layer containing a UV cured reaction product of (a) a polyfunctional acrylic ester monomer, (b) an organic silicon compound represented by the formula $R^4_c SiX_{4-c}$ wherein R is an organic group containing olefinic unsaturation, X is an alkoxy, acyloxy, and aryloxy group, and c is an integer of from 1 to 3, and (c) an acrylate modified polymer; and (ii) a thermoset silica filled organopolysiloxane top coat on said UV cured primer layer.

A process for producing a coated polycarbonate article comprising (i) priming a polycarbonate substrate with a UV curable primer composition containing (a) a polyfunctional acrylic acid ester monomer, (b) an organic silicon compound represented by the formula $R^4_c SiX_{4-c}$ wherein R, X and c are as defined above, (c) an acrylate modified polymer, (d) a UV photoinitiator, and (e) resorcinol monobenzoate; (ii) UV curing said primer composition; (iii) applying a colloidal silica containing organopolysiloxane top coat composition to the primed substrate; and (iv) curing the organopolysiloxane.

55 Claims, No Drawings

POLYCARBONATE ARTICLES COATED WITH AN ADHERENT, DURABLE SILICA FILLED ORGANOPOLYSILOXANE COATING AND PROCESS FOR PRODUCING SAME

This application is a continuation-in-part of copending application Ser. No. 895,943, filed Apr. 12, 1978, now abandoned.

This invention relates to transparent organopolysiloxane coated polycarbonate articles wherein the polysiloxane is tenaciously adhered to the polycarbonate substrate and to a process for producing such an article. More particularly, the present invention relates to a silica filled organopolysiloxane coated polycarbonate article having a primer layer between the polycarbonate and the organopolysiloxane comprising the UV light cured reaction product of a polyfunctional acrylic acid ester monomer, a certain organo silicon compound, and an acrylate modified polymer. The process for producing said article comprises priming the polycarbonate substrate with an adhesion promoting, thermosettable primer composition comprised of a polyfunctional acrylic acid ester monomer, a specific organic silicon compound, an acrylate modified polymer, a resorcinol monobenzoate, and a photocure initiator by forming a thin film thereon; curing said film by exposure to ultraviolet light; coating the primed surface with a top coating composition containing a silica filled further curable organopolysiloxane; and finally curing said further curable organopolysiloxane.

BACKGROUND OF THE INVENTION

The use of transparent glazing material utilizing polycarbonate resin as a structural component for windows, windshields and the like are well known. While these polycarbonate resins are easily fabricated into the desired shape and have excellent physical and chemical properties, such as being less dense than glass and having more breakage resistance than glass, their abrasion, scratch and mar resistance is relatively low.

In order to overcome this relatively low scratch and mar resistance, various coatings have been applied to these polycarbonate resins. U.S. Pat. Nos. 3,451,838, 3,986,997 and 4,027,073 disclose a coating composition and technique for the application of organopolysiloxane coatings onto these surfaces. While these coatings have many desirable properties, e.g., they are hard, mar-resistant, scratch-resistant, and chemical solvent resistant, these organopolysiloxane coatings do not in all instances possess the desired degree of uniform adherence to and durability on the polycarbonate surfaces. There is a need for polycarbonate articles having uniformly, tenaciously and durably adhered scratch, mar and chemical solvent resistant coatings thereon, and it is a primary object of the present invention to provide such articles and a relatively simple and economical process for producing these articles.

DESCRIPTION OF THE INVENTION

This invention relates to silica filled organopolysiloxane coated polycarbonate articles having an adhesion promoting primer layer and to a process for producing these articles.

In the practice of the present invention, prior to the application of the silica filled organopolysiloxane coating to the polycarbonate surface, the surface is first primed by the application of a UV curable primer composition containing (a) at least one polyfunctional acrylic ester monomer, (b) at least one organo silicon compound, (c) at least one acrylate modified polymer, and (d) a UV photoinitiator. This primer composition is cured by exposure to UV light, and the colloidal silica filled organopolysiloxane top coating is then applied thereon. The aromatic carbonate polymer of the instant invention has recurring units of the formula:

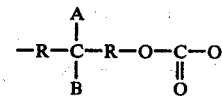

wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining

atom form a cycloalkane radical, the total number of carbon atoms in A and B being up to 12.

The aromatic carbonate polymer of this invention may be prepared by methods well known in the art and as described in U.S. Pat. No. 3,989,672, all of which are incorporated by reference.

Also, included herein are branched polycarbonates wherein a polyfunctional aromatic compound is reacted with the dihydric phenol and carbonate precursor to provide a thermoplastic randomly branched polycarbonate wherein the recurring units of formula I. contain branching groups.

The preferred polycarbonate resins may be derived from the reaction of bisphenol-A and phosgene. These polycarbonates have from 10–400 recurring units of the formula:

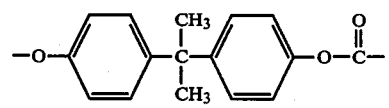

The polycarbonate should have an intrinsic viscosity between 0.3 and 1.0, preferably from 0.40 to 0.65 as measured at 25° C. in methylene chloride. The UV curable primer composition comprises: (i) a polyfunctional acrylic ester monomer; (ii) a certain organic silicon compound; (iii) an acrylate modified polymer; and (iv) a UV photoinitiator. The polyfunctional acrylic ester monomers of the present invention are represented by the general formula

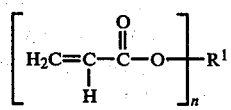

wherein n is an integer from 2 to 8, preferably from 2 to 6, and more preferably from 2 to 4, inclusive; and, $R^1$ is an n valent saturated aliphatic hydrocarbon radical, n valent substituted saturated aliphatic hydrocarbon radical, n valent ether radical, n valent polyether radical, n valent substituted ether radical, n valent substituted polyether radical, n valent olefinically unsaturated aliphatic hydrocarbon radical, n valent substituted olefinically unsaturated aliphatic hydrocarbon radical, n valent aromatic hydrocarbon radicals, and n valent substituted aromatic hydrocarbon radicals.

By n valent saturated aliphatic hydrocarbon radicals is meant n valent radicals derived from saturated aliphatic hydrocarbons, i.e., alkanes by removal of n hydrogens therefrom. Preferred n valent saturated aliphatic hydrocarbon radicals are those containing from 1 to about 20 carbon atoms. Some non-limiting examples of these preferred n valent saturated aliphatic hydrocarbon radicals include

—CH$_2$—, —CH$_2$CH$_2$—, —CH$_2$CHCH$_2$—, —CH$_2$CH$_2$CH$_2$CH$_2$—,

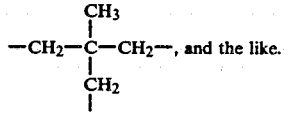

and the like.

These n valent saturated aliphatic hydrocarbon radicals may contain substituent groups thereon. Preferred n valent substituted saturated aliphatic hydrocarbon radicals are those containing from 1 to about 20 carbon atoms. These preferred n valent substituted saturated aliphatic hydrocarbon radicals can contain substituent groups such as the halogens, i.e., fluorine, chlorine, bromine and iodine, hydroxyl, —COOR$^2$, —OR$^2$, —CH, —COOH, —NO$_2$, —NH$_2$, and —NR$^2$ wherein R$^2$ represents alkyl radicals containing from 1 to about 6 carbon atoms. Some non-limiting examples of n valent substituted saturated aliphatic hydrocarbon radicals include

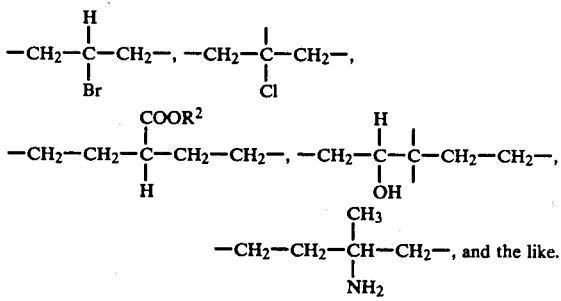

and the like.

By n valent olefinically unsaturated aliphatic hydrocarbon radicals is meant n valent radicals derived from olefinically unsaturated aliohatic hydrocarbons, i.e., alkenes by removal of n hydrogens therefrom. Preferred n valent olefinically unsaturated aliphatic hydrocarbon radicals are those containing from 2 to about 20 carbon atoms. Some non-limiting examples of these radicals include

—CH=CH—, —CH$_2$—CH=CH—CH$_2$—,

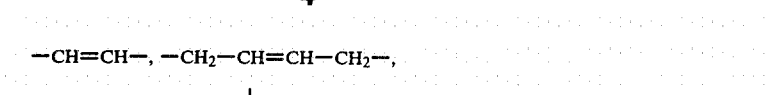

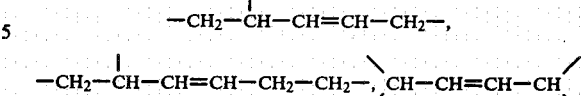

and the like.

These no valent olefinically unsaturated aliphatic hydrocarbon radicals may contain substituent groups thereon. Preferred n valent substituted olefinically unsaturated aliphatic hydrocarbon radicals are those containing from 2 to about 20 carbon atoms. These radicals can contain substituent groups such as the halogens, —COOR$^2$, —OR$^2$, —CN, —COOH, —NO$_2$, —NH$_2$, and —NR$^2$ wherein R$^2$ is as defined above. Some non-limiting examples of n valent substituted olefinically unsaturated aliphatic hydrocarbon radicals include

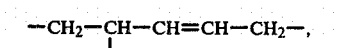

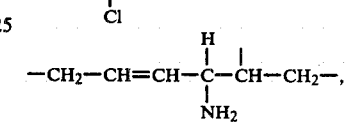

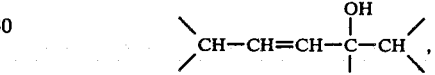

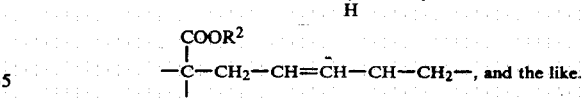

and the like.

By n valent ether radicals is meant n valent radicals derived from ethers by removal of n hydrogens therefrom. Preferred n valent ether radicals are those containing from 2 to about 20 carbon atoms. Some non-limiting examples of these n valent ether radicals include

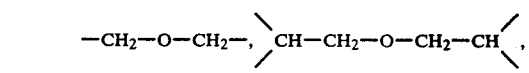

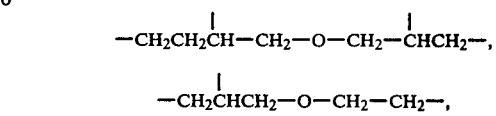

and the like.

These n valent ether radicals may contain substituent groups thereon. Preferred n valent substituted ether radicals are those containing from 2 to about 20 carbon atoms. These radicals can contain substituent groups such as the halogens, —COOR$^2$, —OR$^2$ —CN, —COOH, —NO$_2$, —NH$_2$, and —NR$^2$ wherein R$^2$ is as defined above. Some non-limiting examples of n valent substituted ether radicals include

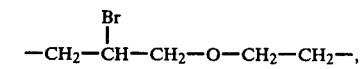

-continued

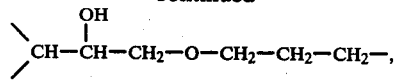

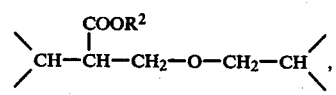

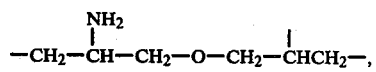

and the like.

By n valent polyether radicals is meant n valent radicals derived from polyethers, which polyethers are represented by the general formula $\text{-}(R^3O)_x\text{-}$ wherein x is an integer from 2 to about 5 and $R^3$ is a lower alkyl, by removal of n hydrogens therefrom. Preferred n valent polyether radicals are those containing from 3 to about 20 carbon atoms. Some non-limiting examples of these n valent polyether radicals include $$-CH_2-CH_2-O-CH_2CH_2-O-CH_2CH_2-,$$

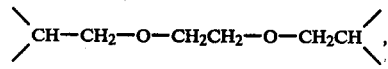

$$-CH_2-O-CH_2-O-CH_2-,$$

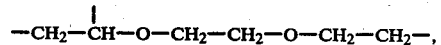

and the like.

These n valent polyether radicals may contain substituent groups such as halogens, hydroxyl, —COOR², CN, —COOH, —NO₂, —NH₂ and —NR² thereon. Some non-limiting examples of these n valent substituted polyether radicals include

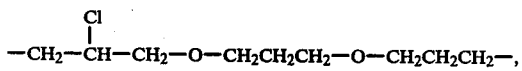

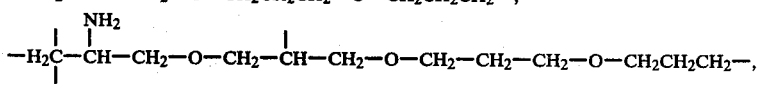

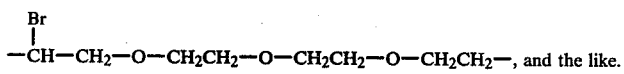

and the like.

By n valent aromatic hydrocarbon radicals is meant n valent radicals derived from aromatic hydrocarbons, e.g., benzene, naphthalene and anthracene, by removal of n hydrogens therefrom. Preferred n valent aromatic hydrocarbon radicals are those containing from 6 to 18 carbon atoms. Some non-limiting examples of these preferred n valent saturated aliphatic hydrocarbon radicals include

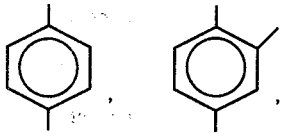

and the like. These n valent aromatic hydrocarbon radicals may further contain substituent groups such as halogens, lower alkyls, hydroxyl, —COOR², —COOH, —NH₂, —NO₂, —OR², and —CN thereon.

It is to be understood that where substituent groups are present, they should be such that they do not unduly hinder or interfere with the photocure of the polyfunctional acrylic monomers.

In the practice of the present invention, it is preferred that $R^1$ be a n valent saturated aliphatic hydrocarbon radical, a n valent ether radical, or a n valent polyether radical.

More particularly, the difunctional acrylic acid ester monomers, or diacrylates, are represented by formula III wherein n is 2; the trifunctional acrylic acid ester monomers, or triacrylates, are represented by formula III wherein n is 3; and the tetra-functional acrylic ester monomers, or tetraacrylates, are represented by formula III wherein n is 4.

Illustrative of suitable polyfunctional acrylate ester monomers of formula III are those listed below in TABLE I.

TABLE I

| Diacrylates of Formula III | |
|---|---|
| $CH_2=CHCOO-CH_2-OOCCH=CH_2$ | 1. |
| $CH_2=CHCOO-CH_2-CH_2-OOCCH=CH_2$ | 2. |
| $CH_2=CHCOO-CH_2-CHOHCH_2-OOCCH=CH_2$ | 3. |
| $CH_2=CHCOO-(CH_2)_6-OOCCH=CH_2$ | 4. |
| $CH_2=CHCOO-CH_2-CH_2-\underset{\underset{OOCCH=CH_2}{\mid}}{CH}-CH_3$ | 5. |
| $CH_2=CHCOO-CH_2CH_2OCH_2CH_2-OOCCH=CH_2$ | 6. |
| $CH_2=CHCOO-CH_2CH_2OCH_2CH_2OCH_2CH_2OCH_2CH_2-OOCCH=CH_2$ | 7. |
| $CH_2=CHCOO-CH_2-\underset{\underset{CH_3}{\mid}}{\overset{\overset{CH_3}{\mid}}{C}}-OOCCH=CH_2$ | 8. |

TABLE I-continued

9. $CH_2=CHCOO-CH_2-\underset{\underset{CH_3}{|}}{\overset{\overset{CH_2Br}{|}}{C}}-OOCCH=CH_2$ 10. $CH_2=CHCOO-CH_2-\underset{\underset{CH_3}{|}}{\overset{\overset{CH_2OH}{|}}{C}}-OOCCH=CH_2$ 11. $CH_2=CHCOO-CH_2-\underset{\underset{CH_2OH}{|}}{\overset{\overset{CH_2OH}{|}}{C}}-OOCCH=CH_2$ 12. $CH_2=CHCOO-CH_2-\underset{\underset{CH_2Br}{|}}{\overset{\overset{CH_2OH}{|}}{C}}-OOCCH=CH_2$

13. $CH_2=CHCOO-CH_2-CH=CH-CH_2-CH_2-OOCCH=CH_2$

14. $CH_2=CHCOO-CH_2-CH=CH-\underset{\underset{CH_2OH}{|}}{CH}-OOCH=CH_2$

15. $CH_2=CHCOO-CH_2-\underset{\underset{CH_2Cl}{|}}{\overset{\overset{CH_3OH}{|}}{C}}-CH_2OOCCH=CH_2$ 16. $CH_2=CHCOO-CH_2-\underset{\overset{OCH_3}{|}}{CH}-CH_2-OOCH=CH_2$ 17. $CH_2=CHCOO-\langle\bigcirc\rangle-OOCCH=CH_2$ 18. $CH_2=CHCOO-\langle\bigcirc\rangle(CH_3)-OOCCH=CH_2$ 19. $CH_2=CHCOO-\langle\bigcirc\rangle(Br)-OOCCH=CH_2$ 20. $CH_2=CHCOO-\langle\bigcirc\rangle(OH)-OOCCH=CH_2$

21. $CH_2=CHCOO-CH(C_6H_5)CH_2CH_2-OOCCH=CH_2$

22. $CH_2=CHCOO-CH_2CH_2\underset{\overset{OOCCH_2CH_3}{|}}{CH}\;CH_2-OOCCH=CH_2$

Triacrylates of Formula III

23. $\begin{array}{c}CH_2=CHCOO-CH_2\\CH_2=CHCOO-CH_2-\underset{|}{C}-CH_2-CH_3\\CH_2=CHCOO-CH_2\end{array}$ 24. $CH_2=CHCOO-CH_2-\underset{\underset{CH_2-OOCCH=CH_2}{|}}{\overset{\overset{CH_2OH}{|}}{C}}-CH_2-OOCCH=CH_2$ 25. $CH_2=CHCOO-\langle\bigcirc\rangle(OOCCH=CH_2)-OOCCH=CH_2$

Tetraacrylates of Formula III

TABLE I-continued

26. 
$$CH_2=CHCOO-CH_2-C-CH_2-OOCCH=CH_2$$
with $CH_2=CHCOO-CH_2$ and $CH_2=CHCOO-CH_2$ branches 27.
$$CH_2=CHCOO-CH_2\ CH-CH\ CH_2-OOCCH=CH_2$$
with $CH_2=CHOO-CH_2$ and $CH_2-OOCCH=CH_2$ branches 28.
$$CH_2=CHCOO-CH_2CHCH-CH_2CH-OOCCH=CH_2$$
with OH, $CH_2=CHCOO-CH_2$, and $CH_2-OOCCH-CH_2$ branches These polyacrylate esters and their production are well known to those skilled in the art. One method of producing the di-, tri-, and tetraacrylate esters involves reacting acrylic acid with a di-, tri-, or tetrahydroxyl compound to produce the diester, triester or tetraester. Thus, for example, acrylic acid can be reacted with ethylene glycol to produce ethylene glycol diacrylate (compound 2 in Table I).

It is to be understood that the instant primer compositions may contain only one polyfunctional acrylic acid ester monomer or a mixture of two or more, preferably two, different monomers. In certain instances, it is preferred that the primer compositions contain mixtures or two or more, preferably two, different monomers.

The organic silicon compounds of the present invention are represented by the formula $$R^4_c SiX_{4-c} \quad \text{IV.}$$

wherein X independently represents an alkoxy, acyloxy and aryloxy group, $R^4$ represents an organic group containing olefinic unsaturation, and c is an integer from 1 to 3.

Preferred alkoxy groups are those containing from 1 to about 10 carbon atoms. Exemplary preferred alkoxy groups include methoxyethoxy, propoxy, butoxy, pentoxy, heptoxy, and the like. Preferred acyloxy groups are those containing from 2 to about 10 carbon atoms. Exemplary preferred alkoxy groups include acetoxy, propionoxy, butyroxy, pentanoxy, hexanoxy, and the like. The preferred aryloxy group is phenoxy.

$R^4$ represents an organic group containing olefinic unsaturation such that the compound of formula IV will co-react with the polyfunctional acrylic acid ester monomer and with the acrylate modified polymer upon exposure to UV light and in the presence of a UV photoinitiator to form a thermoset reaction product which improves the adhesion of an organopolysiloxane to the polycarbonate substrate. More particularly, $R^4$ is a radical represented by the formula $$\begin{array}{c} Y\ \ O \\ |\ \ \ || \\ CH_2=C-C-O-R^5- \end{array} \quad \text{V.}$$

wherein $R^5$ is a divalent saturated aliphatic hydrocarbon radical, preferably containing from 1 to about 12 carbon atoms and, more preferably, containing from 2 to about 6 carbon atoms, and Y is hydrogen or methyl; and a maleamic acid radical represented by the formula

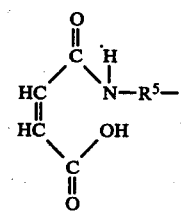

wherein $R^5$ is as defined above. Some non-limiting examples of $R^5$ include $$-CH_2CH_2-,\ -CH_2-CH_2-CH_2-,\ -CH_2-\underset{\underset{CH_3}{|}}{\overset{\overset{CH_3}{|}}{C}}-CH_2-,$$

and the like.

The primer compositions of the instant invention may contain only one type of organic silicon compound of formula IV or they may contain mixtures of two or more, but preferably two, different organic silicon compounds. Thus, for example, the primer compositions may contain two different compounds of formula V, two different compounds of formula VI, or one compound of formula V and one compound of formula VI.

The third component of the coating compositions of the present invention is an acrylate modified polymeric resin. The acrylate modified polymeric resins are conventional polymer types whose structure and preparation are known in the art. These acrylate modified polymers have UV reactive acrylate groups incorporated into the polymer. Generally, these acrylate modified polymers are represented by the general formula Polymer—[Acrylate]$_x$   VII.

wherein x is an integer of from 1 to about 5 and Polymer is an x valent polymeric material, and Acrylate is a mono-, di-, tri- or tetraacrylate group. Thus, a difunctional polymer, wherein x is 2, would have a structure represented by the formula Acrylate—Polymer—Acrylate,   VIII.

a trifunctional polymer, wherein x is 3, would have the structure represented by the formula Acrylate—Polymer—Acrylate,
|
Acrylate and so forth.

Thus, a polymer having monofunctional acrylates attached thereto would be represented by the formula

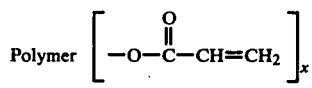  IX.

wherein Polymer and x are as defined above. A polymer having polyfunctional acrylates attached thereto would be represented by the formula

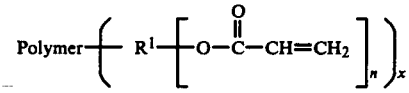  X.

wherein Polymer, $R^1$, n and x are as defined above.

Polymers having both monofunctional and polyfunctional acrylate groups attached thereto are also useful in the practice of the present invention. These types of acrylate modified polymers are represented by the structural formula

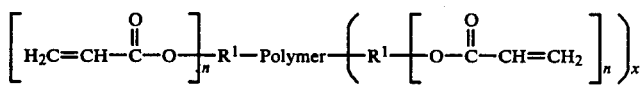

wherein Polymer, $R^1$, x and n are as defined above, provided that the sum of x+n does not exceed 5.

Exemplary typical acrylate modified polymers, wherein the acrylate is a monoacrylate, are acrylate polyesters represented by the formula

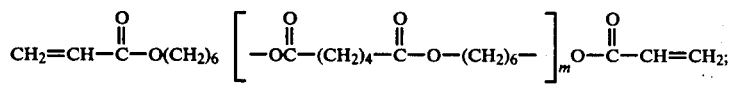

acrylate epoxies represented by the formula

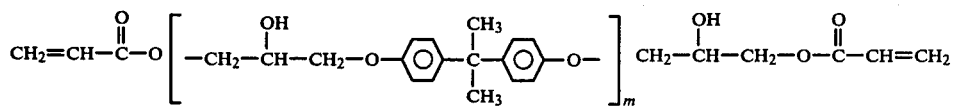

and acrylate urethanes represented by the formula

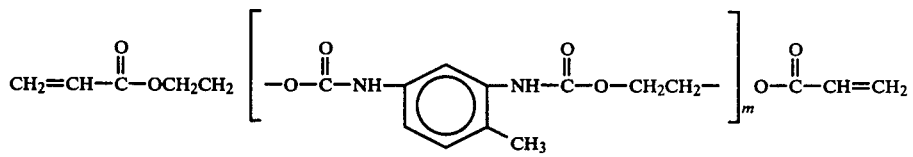

Preferred acrylate modified polymers are the acrylate epoxies as described in U.S. Pat. No. 3,586,526, acrylate urethanes as described in U.S. Pat. No. 3,297,745, acrylate alkyd urethanes as described in U.S. Pat. No. 3,673,140, acrylate polycaprolactones as described in U.S. Pat. No. 3,700,643, acrylate unsaturated acid modified drying oils as described in U.S. Pat. No. 3,712,871, acrylate polyesters, and acrylate polyethers as described in U.S. Pat. No. 3,380,831, said references being incorporated herein by reference.

Generally, the primer compositions of the present invention contain a ratio, by weight, of acrylate polyfunctional acrylic acid ester monomer to acrylate modified polymer of from about 1:10 to about 10:1, preferably from about 1:2 to about 2:1. The amount of polyfunctional acrylic acid ester monomer plus acrylate modified polymer present in the primer compositions is generally from about 10 to about 80 weight percent, preferably from about 20 to about 40 weight percent, while the amount of organic silicon compound present is generally from about 20 to about 90 weight percent, preferably from about 40 to about 80 weight percent.

The photocurable primer compositions also contain a photoinitiating amount of photoinitiator, i.e., an amount effective to effect the photocure of the coating composition. Generally, this amount is from about 0.01% to about 10% by weight, preferably from about 0.1% to about 5% by weight of the photocurable primer composition, exclusive of any solvent present. These additives and the cure thereof are generally well known in the art. Some nonlimiting examples of these UV radiation photosensitizers include ketones, such as benzophenone, acetophenone, benzil, benzyl methyl ketone; benzoins and substituted benzoins such as benzoin methyl ether, α-hydroxymethyl benzoin isopropyl ether; halogen containing compounds such as α-bromoacetophenone, p-bromoacetophenone, α-chloromethylnaphthalene; sulfur compounds such as aromatic disulfides; and other photosensitizers such as azides, thioketones, or mixture or synergistic mixtures thereof; the diaryl peroxides; the hydroperoxides; the peracids and peresters; the azo compounds; or any other known free radical initiator, such as di-t-butyl peroxide, benzoyl peroxide, 2,4-dichlorobenzoyl peroxide, t-butyl hydroperoxide, peroxyacetic acid, peroxybenzoic acid, t-butyl peroxypivalate, t-butyl peracetate, azobisisobutyronitrile and the like.

The primer compositions of the present invention further contains a resorcinol monobenzoate. The resorcinol monobenzoate is preferably unsubstituted, although a lower alkyl substituted resorcinol monobenzoate may also be used. Generally, the resorcinol monobenzoate is present in an amount of from about 1 to about 10 percent by weight. Although the resorcinol monobenzoate or substituted resorcinol monobenzoate is generally not believed to be directly involved in the reaction between the polyfunctional acrylic acid ester monomer and the silicon containing compound, and, therefore, is not believed to be generally directly incorporated into the cured cross-linked polymer structure formed by the coreaction of the polyfunctional acrylic acid ester monomer and the silicon containing compound, it nevertheless functions in a manner to promote and increase the durability of adhesion of the silica filled organopolysiloxane top coat to the primary layer, especially upon exposure of the coated polycarbonate article to light. More specifically, during the cure of the primer layer by the action of ultraviolet light, the resorcinol monobenzoate present in said layer is converted, by the ultraviolet radiation, to a dihydroxybenzophenone. This dihydroxybenzophenone then acts, in the cured primer, as an ultraviolet light absorber and promotes the durability and adhesion of the silica filled organopolysiloxane top coat to the primer layer.

The primer compositions of the instant invention may also optionally contain various flatting agents, surface active agents, UV light absorbers, and thixotropic agents. All of these additives and the use thereof are well known in the art and do not require extensive discussions. Therefore, only a limited number will be referred to, it being understood that any compounds possessing the ability to function in such a manner, i.e., as a flatting agent, surface active agent, ultraviolet light absorber and the like, can be used so long as they do not deleteriously affect the photocuring of the primer compositions, do not adversely affect the non-opaque character of the coated polycarbonate article, and do not adversely affect the adhesion promoting characteristics of the primer layer.

The various surface-active agents, including anionic, cationic and nonionic surface-active agents are described in *Kirk-Othmer Encyclopedia of Chemical Technology,* Vol. 19, Interscience Publishers, New York, 1969, pp. 507–593, and *Encyclopedia of Polymer Science and Technology,* Vol. 13, Interscience Publishers, New York, 1960, pp. 477–486, both of which are references and incorporated herein.

The ultraviolet light absorbing compounds can optionally be present in an amount effective to protect the polycarbonate substrate from the degradative effects of ultraviolet light, provided that they do not unduly interfere with or hinder the photocuring of the primer compositions. Some non-limiting examples of suitable ultraviolet light absorbing compounds are benzophenone derivatives such as 2,2'-dihydroxybenzophenone, 2,2',4,4'-tetrahydroxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dihydroxy-4,4'-dibutoxybenzophenone, 2,2'-dihydroxy-4-methoxy-4'-ethoxybenzophenone, 2,2'-dihydroxy-4-methoxy-4'-propoxybenzophenone, 2,2'-dihydroxy-4-methoxy-4'-butoxybenzophenone, and the like; and, benzotriazole derivatives such as 2-(2'-hydroxy-5'-methylphenyl)benzotriazole, 2-(2'-hydroxy-5'-tert-butylphenyl) benzotriazole, 2-(2'-hydroxy-3'-methyl-5'-tert-butylphenyl) benzotriazole, 2-(2'-hydroxy-5'-cyclohexylphenyl)-benzotriazole, 2-(2'-hydroxy-3',5'-dimethylphenyl) benzotriazole, and the like.

In the practice of the present invention, the photocurable primer compositions are first compounded by adding together the polyfunctional acrylic acid ester monomer, the further curable acrylate modified polymer, the organo silicon compound, the UV photoinitiator, the resorcinol monobenzoate, and, optionally, any of the other aforementioned additives. Additionally, if so desired to reduce the viscosity of the primer formulation or to aid in solubilizing the organo silicon compounds, an organic solvent may be incorporated into the formulation. Generally, the amount of solvent, if any, present should be such that evaporation of the solvent occurs before any deleterious effect on the substrate due to the aggressiveness (in the chemical etching sense) of the primer compositions develops. The various components are thoroughly mixed so as to form a generally homogeneous primer composition. A thin, uniform film of the primer solution is then applied onto the polycarbonate surface by any of the known means such as dipping, spraying, roll-coating and the like. Generally, the primer composition is applied in an amount sufficient to provide a cured film of from about 0.005 mil to about 0.5 mil, preferably from about 0.05 mil to about 0.2 mil thick. The primer film is then cured in an inert, e.g., nitrogen, atmosphere, by UV irradiation which can have a wavelength of from 1849 A. to 4000 A. The lamp systems used to generate such radiation can consist of ultraviolet lamps which can consist of discharge lamps, as for example, xenon, metallic halide, metallic arc, such as low or high pressure mercury vapor discharge lamps, etc., having generating pressure of from as low as a few milli- torr up to about 10 atmospheres, can be employed. After UV curing, there is present on the surface of the polycarbonate a non-opaque primer which is adhered to the polycarbonate. This UV cured primer is the reaction product of the aforedescribed (i) polyfunctional acrylic acid ester monomer or mixtures of polyfunctional acrylic acid ester monomers; (ii) organic silicon compound or mixtures of organic silicon compounds; and (iii) the acrylate modified polymers or mixtures of acrylate modified polymers. The ultraviolet radiation cured primer further contains the photoreaction products of the resorcinol monobenzoate, alkyl, preferably lower alkyl, substituted resorcinol monobenzoate or mixtures thereof. These products consist mainly of dihydroxybenzophenone, or in the case of alkyl substituted resorcinol monobenzoate, alkyl substituted dihydroxybenzophenone.

While not wishing to be bound by any theory, it is believed that the cure of this primer composition occurs through the reaction of the polyfunctional acrylic acid ester monomers by means of the olefinic unsaturation with each other; (ii) through the reaction of the organic silicon compounds with each other by means of the olefinic unsaturation; (iii) by the reaction of the acrylate modified polymers with each other by means of the olefinic unsaturation of the acrylate group; (iv) by the reaction of the polyfunctional acrylic acid ester monomers and/or polymers with the organic silicon compounds and/or polymers thereof by means of the olefinic unsaturation present in each, and/or the reaction of said polyfunctional acrylic acid ester monomers and/or polymers with the acrylate modified polymer and/or the reaction products thereof by means of the olefinic unsaturation present in each, and/or the reaction, through the olefinic unsaturation of each, of the organic silicon compound and/or polymers thereof with the acrylate modified polymers and/or the reaction products thereof. The resulting reaction product is thermoset, hard, non-tacky and is tenaciously adhered to the polycarbonate substrate.

In the practice of this invention, the top coat composition containing a further curable organopolysiloxane and colloidal silica is applied onto the ultraviolet radiation cured primer and is then cured to form a thermoset silica filled organopolysiloxane top coat.

A particularly useful silica filled further curable organopolysiloxane useful in formulating the top coat composition is one available from Dow-Corning Corp., Midland, Michigan, and described in U.S. Pat. Nos. 3,986,997 and 4,027,073. This silica filled further curable organopolysiloxane comprises a dispersion of colloidal silica in a lower aliphatic alcohol-water solution of the partial condensate of a silanol having the formula $$R^6Si(OH)_3 \qquad \qquad XI.$$

wherein $R^6$ is selected from the group consisting of alkyl radicals containing from 1 to 3 carbon atoms, the vinyl radical, the 3,3,3-trifluoropropyl radical, the gamma-glycidoxypropyl radical and the gamma-methacryloxypropyl radical, with at least 70 percent by weight of said silanol being $CH_3Si(OH)_3$. This composition generally contains from about 10 to about 50 percent by weight of solids, said solids consisting essentially of a mixture of from about 10 to about 70 percent by weight of colloidal silica and from about 30 to about 90 percent by weight of the partial condensate of a silanol. The partial condensate of a silanol, i.e., a siloxanol, is obtained, preferably, entirely from the condensation of $CH_3Si(OH)_3$, however, the partial condensate may also optionally be comprised of a major portion which is obtained from the condensation of $CH_3Si(OH)_3$ and a minor portion which is obtained from the condensation of monoethyltrisilanol, monopropyltrisilanol, monovinyltrisilanol, mono gamma-methacryloxy-propyltrisilanol, mono gamma-glycidoxypropyltrisilanol, or mixtures thereof. The composition further contains sufficient acid to provide a pH in the range of 3.0 to 6.0. The pH is maintained in this range in order to prevent premature gellation and increase the shelf life of the silica filled organopolysiloxane top coat composition and to obtain optimum properties in the cured coating. Suitable acids include both organic and inorganic acids such as hydrochloric, chloroacetic, acetic, citric, benzoic, formic, propionic, maleic, oxalic, glycolic and the like. The acid can be added to either the silane, which hydrolyzes to form the silanol component of the composition, or the hydrosol prior to mixing the two components.

The trisilanol component of the top coat composition of the present invention is generated in situ by the addition of the corresponding trialkoxysilanes to aqueous dispersions of colloidal silica. Suitable trialkoxysilanes are those containing methoxy, ethoxy, isopropoxy and t-butoxy substituents. Upon generation of the silanol in the acidic aqueous medium, there is condensation of the hydroxyl substituents to form —Si—O—Si bonding. The condensation is not complete, but rather the siloxane retains an appreciable quantity of silicon-bonded hydroxyl groups, thus rendering the organopolysiloxane polymer soluble in the water alcohol solvent. This soluble partial condensate can be characterized as a siloxanol polymer having at least one silicon-bonded hydroxyl group per every three —SiO— units. During curing of the top coating composition on the primer, these residual hydroxyl groups condense to give a silsesquioxane, $R^6SiO_{3/2}$.

The silica component of the top coat composition is present in the form of colloidal silica. Aqueous colloidal silica dispersions generally have a particle size in the range of 5 to 150 millimicrons in diameter. These silica dispersions are prepared by methods well-known in the art and are commercially available. It is preferred to use colloidal silica having a particle size in the range of 10 to 30 millimicrons in diameter in order to obtain dispersions having a greater stability and to provide top coatings having superior optical properties.

The silica filled organopolysiloxane top coat compositions are prepared by adding trialkoxysilanes to colloidal silica hydrosol and adjusting the pH to a range of 3.0 to 6.0 by the addition of acid. As mentioned previously, the acid can be added to either the silane or the silica hydrosol before the two components are mixed. Alcohol is generated during the hydrolysis of the trialkoxy silanes to the trisilanols. Depending upon the percent solids desired in the final coating composition, additional alcohol, water, or a water-miscible solvent can be added. Suitable alcohols are the lower aliphatic alcohols such as methanol, ethanol, isopropanol, t-butanol, and mixtures thereof. Generally, the solvent system should contain from about 20 to about 75 weight percent alcohol to ensure solubility of the siloxanol formed by the condensation of the silanol. If desired, a minor amount of an additional water-miscible polar solvent such as acetone, butyl cellosolve, and the like can be added to the water-alcohol solvent system. Generally, sufficient alcohol or water alcohol solvent is added to give a composition containing from about 10 to about 50 percent by weight of solids, said solids generally comprising from about 10 to about 70 percent by weight of colloidal silica and from about 30 to about 90 percent by weight of the partial condensate of the silanol. The composition is allowed to age for a short period of time to ensure formation of the partial condensate of the silasol, i.e., the siloxanol. This condensation occurs upon generation of the silanol in the acidic aqueous medium through the hydroxyl substituents to form Si-O-Si bonding. The condensation is not complete, resulting in a siloxane having an appreciable quantity of silicon-bonded hydroxyl group. This aged, silica filled further curable organopolysiloxane top coat composition is then applied onto the primed polycarbonate by any of the commonly known methods such as dipping, spraying, flow-coating and the like. After the top coat composition is applied to the primed polycarbonate, the polycarbonate is air dried to evaporate the volatile solvents from the top coat composition. Thereafter, heat is applied to cure the top coat. During curing, the residual hydroxyls of the siloxane condensate to give a silsesquioxane, $R^6SiO_{3/2}$. The result is a silica filled cross-linked organopolysiloxane top coat which is tenaciously adhered to the substrate and is highly resistant to scratching, abrasion, chemical solvents, and marring. Generally, the top coat contains from about 10 to about 70 weight percent silica and from about 30 to about 90 weight percent of the organopolysiloxane present as the silsesquioxane $R^6SiO_{3/2}$.

The thickness of the top-coat generally is dependent upon the method of application and upon the weight percent solids present in silica filled further curable organopolysiloxane top coat composition. In general, the higher the percent solids, and the longer the application time, the greater the thickness of the top coat. It is preferred that the cured top coat have a thickness of from about 0.1 to about 0.5 mils, more preferably from 0.15 to about 0.4 mils, and most preferably from about 0.2 to about 0.25 mils.

Another embodiment of the present invention is a process of producing a mar, abrasion, scratch and chemical resistant polycarbonate article. The process comprises the steps of: (i) applying onto the polycarbonate an ultraviolet light curable primer composition containing (a) at least one polyfunctional acrylic acid ester monomer represented by formula III, (b) an organo silicon compound containing at least one olefinically unsaturated organic group, said compound being represented by formula IV, (c) a further reactive acrylate modified polymer; (d) an ultraviolet light photoinitiator, and (e) a resorcinol monobenzoate; (ii) applying ultraviolet light of sufficient strength and for a period of time effective to cure said primer composition and form a cured primer layer on said polycarbonate substrate, said cured primer layer containing the reaction product of said polyfunctional acrylic acid ester monomer, said further reactive acrylate modified polymer, and said organo silicon compound and further containing photoreaction products of said resorcinol monobenzoate, alkyl substituted resorcinol monobenzoate or mixtures thereof; (iii) applying a silica filled further curable organopolysiloxane top coat composition onto said cured primer layer, the top coat composition comprising a dispersion of colloidal silica in a lower alkanol-water solution of the partial condensate of a silanol of the formula $R^6Si(OH)_3$ in which $R^6$ is selected from the group consisting of alkyl radicals containing from 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$; (iv) evaporating off the volatile solvents present in the top coat composition; and (v) curing the top coating by the application of heat thereto to form a silica filled thermoset organopolysiloxane, i.e., a silsesquioxane.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein.

EXAMPLE 1

An aromatic polycarbonate is prepared by reacting 2,2-bis(4-hydroxyphenyl)propane and phosgene in the presence of an acid acceptor and a molecular weight regulator and having an intrinsic viscosity of 0.57. The product is then fed to an extruder, which extruder is operated at about 205° C. and the extrudate is comminuted into pellets.

The pellets are then injection molded at about 315° C. into test panels of about 4 in. by 4 in. by about ⅛ in. thick.

EXAMPLE 2

A primer coating composition is prepared by blending 10 parts by weight of Uvimer 545 resin (an acrylated urethane polymer derived from 2,4-toluene diisocyanate, hydroxy ethyl acrylate, and pentaerythritol triacrylate) sold by Polychrome Corp., 10 parts by weight of diethyleneglycol diacrylate, 10 parts by weight of a 50% ethanolic solution of N-[3-(triethoxysilyl)propyl] maleamic acid which has been aged, i.e., allowed to stand for an extended period of time, 2 parts by weight of resorcinol monobenzoate, and ½ part by weight of α,α-diethoxyacetophenone. This blend is diluted with isobutanol to give a final solution having a weight to volume percent of 2% of said blend in 98% of isobutanol. A wet film 2-3 mils in thickness of this primer composition is applied to polycarbonate panels prepared in accordance with Example 1. After evaporation of the solvent, the primer film, being about 0.05 mils in thickness, is cured by passing the coated polycarbonate panels through a combination Linde photocuring apparatus which consists of a variable speed conveyor running through a chamber containing germicidal type mercury vapor lamps which emit light mainly at 2537 A°, 3150 A°, and 3605 A°, wherein the nitrogen pressure is 25 psi nitrogen and the speed of the conveyor is 30 ft/min.

A silica filled organopolysiloxane top coat composition containing 37 weight percent solids, 50% of which are $SiO_2$, is formulated by adding an aqueous dispersion of colloidal silica, having $SiO_2$ of approximately 13-14 millimicron particle in size, to methyltrimethoxysilane which has been acidified by the addition of 2.5 weight percent glacial acetic acid. This composition is mixed for four hours and is then adjusted to a pH of 3.9 by addition of more glacial acetic acid. This acidified composition is then diluted to 18% solids by the addition of isopropanol and aged for four days to ensure formation of the partial condensate of $CH_3Si(OH)_3$. Such a colloidal silica filled further curable organopolysiloxane is available from Dow-Corning Corporation and is described in U.S. Pat. Nos. 3,986,997 and 4,027,073.

EXAMPLE 3

A primed polycarbonate panel prepared in accordance with Example 2 is coated with a silica filled further curable organopolysiloxane top coat composition described hereinabove. The panel is air dried for 30 minutes to evaporate the solvent from the silica filled further curable organopolysiloxane top coat composition, followed by a one-hour bake at 250° F. to cure the further curable organopolysiloxane thereby forming a silica filled thermoset organopolysiloxane top coat.

The durability of adhesion of the silica filled thermoset organopolysiloxane top coat to the polycarbonate substrate is greatly increased by the use of the specific primer layer of the present invention. This results in a coated polycarbonate article which can be used in many applications wherein durable scratch, mar, abrasion and chemical solvent resistance is a requirement. Unprimed polycarbonate articles coated with the silica filled thermoset organopolysiloxane top coat lack this durable adhesion of the top coat to the polycarbonate substrate and are thus quite unsuited for such applications as windscreens and windows on trains, vehicles or other applications where a durable, scratch, mar, abrasion and chemical resistant property is required.

The foregoing disclosure of this invention is not to be considered as limiting, since many variations may be made by those skilled in the art without departing from the scope or spirit of the foregoing description.

What I claim as new and desire to secure by Letters Patent of the United States is:

1. A coated polycarbonate article having improved resistance to abrasion comprising a polycarbonate substrate coated with (i) an adhesion promoting primer layer comprising a photoreaction product of (a) at least one polyfunctional acrylic acid ester monomer; (b) at least one organo-silicon compound containing at least one organic group having olefinic unsaturation represented by the general formula $$R^4_c SiX_{4-c}$$

wherein c is an integer having a value from 1 to 3 inclusive, x is an alkoxy, acyloxy and aryloxy radical, and $R^4$ represents a radical selected from $CH_2\!=\!CH\!-\!COO\!-\!R^5\!-\!$, $CH_2\!=\!CCH_3\!-\!COO\!-\!R^5\!-\!$, and

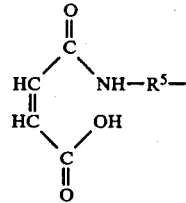

wherein $R^5$ is a divalent saturated aliphatic hydrocarbon radical; (c) at least one acrylate modified polymer; and (ii) a colloidal silica filled thermoset organopolysiloxane top coat disposed on said primer layer.

2. The article of claim 1 wherein said polyfunctional acrylic acid ester monomer is represented by the formula $$(H_2C\!=\!CH\!-\!\overset{O}{\underset{\|}{C}}\!-\!O)_n R^1$$

wherein n is an integer from 2 to 4 inclusive and $R^1$ is an n valent saturated aliphatic hydrocarbon radical, n valent substituted saturated aliphatic hydrocarbon radical, n valent olefinically unsaturated aliphatic hydrocarbon radical, n valent substituted olefinically unsaturated aliphatic hydrocarbon radical, n valent ether radical, n valent substituted ether radical, n valent polyether radical, n valent substituted polyether radical, n valent aromatic hydrocarbon radical, and n valent substituted aromatic hydrocarbon radical.

3. The article of claim 2 wherein $R^1$ is an n valent saturated aliphatic hydrocarbon radical, n valent olefinically unsaturated aliphatic hydrocarbon radical, n valent ether radical, n valent polyether radical, and n valent aromatic hydrocarbon radical.

4. The article of claim 3 wherein $R^1$ is an n valent saturated aliphatic hydrocarbon radical, n valent ether radical, and n valent polyether radical.

5. The article of claim 4 wherein $R^4$ represents a radical having the formula

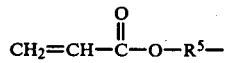

wherein $R^5$ is a divalent saturated aliphatic hydrocarbon radical.

6. The article of claim 4 wherein $R^4$ represents a radical having the formula

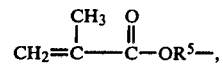

wherein $R^5$ is a divalent saturated aliphatic hydrocarbon radical.

7. The article of claim 4 wherein $R^4$ represents a radical having the formula

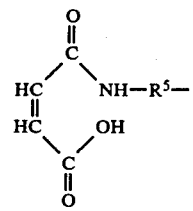

wherein $R^5$ is a divalent saturated aliphatic hydrocarbon radical.

8. The article of claim 5 wherein X is an alkoxy radical and c is 1.

9. The article of claim 8 wherein said alkoxy radical is an ethoxy radical.

10. The article of claim 8 wherein said alkoxy radical is a methoxy radical.

11. The article of claim 6 wherein X is an alkoxy radical and c is 1.

12. The article of claim 11 wherein said alkoxy radical is an ethoxy radical.

13. The article of claim 11 wherein said alkoxy radical is a methoxy radical.

14. The article of claim 7 wherein X is an alkoxy radical and c is 1.

15. The article of claim 14 wherein said alkoxy radical is a methoxy radical.

16. The article of claim 14 wherein said alkoxy radical is an ethoxy radical.

17. The article of claim 1 wherein said acrylate modified polymer is selected from the group consisting of acrylate polyurethanes, acrylate alkyd polyurethanes, acrylate polycaprolactones, acrylate unsaturated acid modified drying oils, acrylate polyesters, and acrylate polyethers.

18. The article of claim 1 wherein said primer layer further contains the photoreaction products of resorcinol monobenzoate, alkyl substituted resorcinol monobenzoate, or mixtures thereof.

19. The article of claim 1 wherein said thermoset organopolysiloxane is a condensation product of a silanol having the formula $R^6Si(OH)_3$, wherein $R^6$ is an alkyl radical of from 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$.

20. The article of claim 19 wherein said thermoset organopolysiloxane is the condensation product of $CH_3Si(OH)_3$.

21. The article of claim 19 wherein said top coat contains from about 10 to about 70 weight percent of colloidal silica and from about 30 to about 90 weight percent of the condensation product of said silanol.

22. A coated polycarbonate article having improved scratch, mar, abrasion and chemical solvent resistance comprising a polycarbonate substrate having deposited on the surface thereof (i) an ultraviolet radiation cured primer layer, said cured primer layer being the photoreaction product of a primer composition containing at least one polyfunctional acrylic acid ester monomer, at least one acrylate modified polymer, at least one organo-silicon compound containing at least one organic group having olefinic unsaturation, a photoinitiator, and a compound selected from resorcinol monobenzoate, lower alkyl substituted resorcinol monobenzoate, or mixtures thereof; and (ii) a cured colloidal silica filled thermoset organopolysiloxane top coat on said cured primer layer said top coat being the thermally cured product of a top coat composition comprising a dispersion of colloidal silica in a lower aliphatic alcohol-water solution of the partial condensate of a silanol of the formula $RSi(OH)_3$ wherein R is selected from alkyl radicals containing 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, said composition containing sufficient acid to provide a pH in the range of 3.0 to 6.0.

23. The article of claim 22 wherein said organo-silicon compound is represented by the general formula

$R^4_c SiX_{4-c}$ wherein c is an integer from 1 to 3 inclusive, X is an alkoxy, acyloxy, or aryloxy radical, and $R^4$ represents a radical selected from

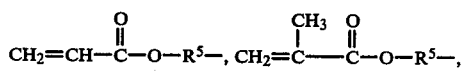

or

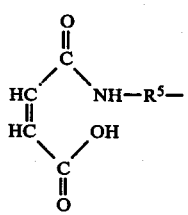

wherein $R^5$ is a divalent saturated aliphatic hydrocarbon radical; and (iv) an ultraviolet light photoinitiator.

24. The article of claim 23 wherein $R^4$ represents a radical having the formula

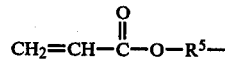

wherein $R^5$ is a divalent saturated aliphatic hydrocarbon radical.

25. The article of claim 23 wherein $R^4$ represents a radical having the formula

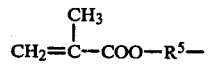

wherein $R^5$ is a divalent saturated aliphatic hydrocarbon radical.

26. The article of claim 23 wherein $R^4$ represents a radical having the formula

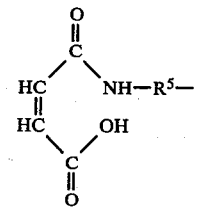

wherein $R^5$ is a divalent saturated aliphatic hydrocarbon radical.

27. The article of claim 24 wherein X is an alkoxy radical and c is 1.

28. The article of claim 27 wherein said alkoxy radical is a lower alkoxy radical.

29. The article of claim 25 wherein X is an alkoxy radical and c is 1.

30. The article of claim 29 wherein said alkoxy radical is a lower alkoxy radical.

31. The article of claim 26 wherein X is an alkoxy radical and c is 1.

32. The article of claim 31 wherein said alkoxy radical is a lower alkoxy radical.

33. The article of claim 22 wherein said polyfunctional acrylic acid ester monomer is represented by the formula

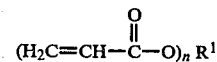

wherein n is an integer from 2 to 4 inclusive and $R^1$ is an n valent saturated aliphatic hydrocarbon radical, n valent substituted saturated aliphatic hydrocarbon radical, n valent olefinically unsaturated aliphatic hydrocarbon radical, n valent substituted olefinically unsaturated aliphatic hydrocarbon radical, n valent ether radical, n valent substituted ether radical, n valent polyether radical, n valent substituted polyether radical, n valent aromatic hydrocarbon radical, and n valent substituted aromatic hydrocarbon radical.

34. The article of claim 33 wherein $R^1$ is an n valent saturated aliphatic hydrocarbon radical, n valent olefinically unsaturated aliphatic hydrocarbon radical, n valent ether radical, n valent polyether radical, and n valent aromatic hydrocarbon radical.

35. The article of claim 34 wherein $R^1$ is an n valent saturated aliphatic hydrocarbon radical, n valent ether radical, and n valent polyether radical.

36. The article of claim 22 wherein said acrylate modified polymer is selected from the group consisting of acrylate polyurethanes, acrylate alkyd polyurethanes, acrylate polycaprolactones, acrylate unsaturated acid modified drying oils, acrylate polyesters, and acrylate polyethers.

37. A process for producing a mar, abrasion, scratch and chemical solvent resistant coated polycarbonate article comprising the steps of:
   (i) applying onto the surface of a polycarbonate substrate an ultraviolet radiation curable primer composition containing (a) at least one polyfunctional acrylic acid ester monomer, (b) at least one organo-silicon compound containing at least one organic group having olefinic unsaturation, (c) resorcinol monobenzoate, alkyl substituted resorcinol monobenzoate, or mixtures thereof, (d) a photoinitiator, and (e) at least one acrylate modified polymer;

(ii) curing said primer composition by exposing said primer composition to ultraviolet radiation to form a cured primer layer;

(iii) applying onto said cured primer layer a silica filled further curable organopolysiloxane top coat composition comprising a dispersion of colloidal silica in a lower aliphatic-water solution of the partial condensate of a silanol of the formula $R^6Si(OH)_3$ wherein $R^6$ is an alkyl radical containing 1 to 3 carbon atoms, the vinyl radical, the 3,3,3-trifluoropropyl radical, the gamma-glycidoxypropyl radical and the gamma-methacryloxypropyl radical, at least 70 weight percent of said silanol being $CH_3Si(OH)_3$, said composition containing sufficient acid to provide a pH in the range of 3.0 to 6.0;

(iv) evaporating the volatile solvents from said top coat composition; and (v) applying heat to said composition to cure said top coat composition, whereby said silanol is condensed further to a silsesquioxane.

38. The process of claim 37 wherein said polyfunctional acrylic acid ester monomer is represented by the formula

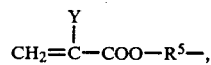

wherein n is an integer from 2 to 4 inclusive and $R^1$ is an n valent saturated aliphatic hydrocarbon radical, n valent substituted saturated aliphatic hydrocarbon radical, n valent olefinically unsaturated aliphatic hydrocarbon radical, n valent substituted olefinically unsaturated aliphatic hydrocarbon radical, n valent ether radical, n valent substituted ether radical, n valent polyether radical, n valent substituted polyether radical, n valent aromatic hydrocarbon radical, and n valent substituted aromatic hydrocarbon radical.

39. The process of claim 38 wherein $R^1$ is a n valent saturated aliphatic hydrocarbon radical, n valent olefinically unsaturated aliphatic hydrocarbon radical, n valent ether radical, n valent polyether radical, and n valent aromatic hydrocarbon radical.

40. The process of claim 39 wherein $R^1$ is a n valent saturated aliphatic hydrocarbon radical, n valent ether radical, and n valent polyether radical.

41. The process of claim 37 wherein said organo-silicon compound is represented by the general formula

wherein c is an integer from 1 to 3 inclusive, X is an alkoxy, acyloxy, or aryloxy radical, and $R^4$ is a compound represented by the formula

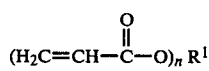

and

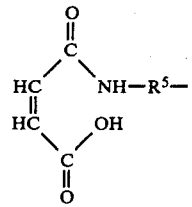

wherein Y is a hydrogen or methyl, and $R^5$ is a divalent saturated aliphatic hydrocarbon radical.

42. The process of claim 41 wherein $R^4$ is a compound represented by the formula

wherein $R^5$ is a divalent saturated aliphatic hydrocarbon radical.

43. The process of claim 41 wherein $R^4$ is a compound represented by the formula

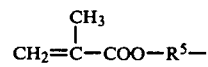

wherein $R^5$ is a divalent saturated aliphatic hydrocarbon radical.

44. The process of claim 41 wherein $R^4$ is a compound represented by the formula

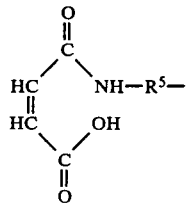

wherein $R^5$ is a divalent saturated aliphatic hydrocarbon radical.

45. The process of claim 42 wherein X is an alkoxy radical and c is 1.

46. The process of claim 43 wherein X is an alkoxy radical and c is 1.

47. The process of claim 44 wherein X is an alkoxy radical and c is 1.

48. The process of claim 37 wherein said acrylate modified polymer is selected from the group consisting of acrylate polyurethanes, acrylate alkyd urethane polymers, acrylate polycaprolactones, acrylate unsaturated acid modified drying oils, acrylate polyesters and acrylate polyethers.

49. A polycarbonate article having improved scratch, mar, abrasion and chemical solvent resistance comprising a polycarbonate substrate having disposed on the surface thereof (i) an ultraviolet radiation cured primer layer, said cured primer layer containing the photoreaction product of (a) at least one polyfunctional acrylic acid ester monomer, (b) at least one acrylate modified polymer, and (c) at least one organic silicon compound represented by the general formula

wherein c is an integer having a value from 1 to 3 inclusive, X is an alkoxy, acyloxy and aryloxy radical, and R⁴ represents a radical selected from
CH₂=CH—COO—R⁵—,
CH₂=C(CH₃)—COO—R⁵—, and

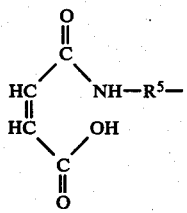

wherein R⁵ represents a divalent saturated aliphatic hydrocarbon radical; and (ii) a cured colloidal silica filled thermoset organopolysiloxane top coat disposed on said cured primer layer, said top coat being the thermally cured product of a top coat composition comprising a dispersion of colloidal silica in a lower aliphatic alcohol-water solution of the partial condensate of a silanol of the formula $R^6Si(OH)_3$ wherein $R^6$ is selected from alkyl radicals containing 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$, said composition containing sufficient acid to provide a pH in the range of 3.0 to 6.0.

50. The article of claim 49 wherein said cured primer contains a photoinitiator.

51. The article of claim 50 wherein said cured primer further contains the photoreaction products of resorcinol monobenzoate, lower alkyl substituted resorcinol monobenzoate, or mixtures thereof.

52. The article of claim 51 wherein said polyfunctional acrylic acid ester monomer is represented by the general formula

wherein n is an integer having a value from 2 to 4, and $R^1$ is a n valent saturated aliphatic hydrocarbon radical, n valent ether radical, and n valent polyether radical.

53. The article of claim 52 wherein R⁴ is represented by the general formula

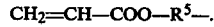

54. The article of claim 52 wherein R⁴ is represented by the general formula

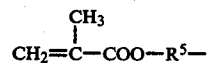

55. The article of claim 53 wherein R⁴ is represented by the general formula

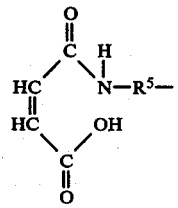

* * * * *